US008218067B2

(12) United States Patent
Wallace

(10) Patent No.: US 8,218,067 B2
(45) **Date of Patent: *Jul. 10, 2012**

(54) SYSTEM AND METHOD FOR EFFECTIVELY PERFORMING A WHITE BALANCE PROCEDURE FOR ELECTRONIC CAMERAS

(75) Inventor: Diane Wallace, Morgan Hill, CA (US)

(73) Assignee: ExpoImaging, Inc., Watsonville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/757,927

(22) Filed: Apr. 9, 2010

(65) Prior Publication Data

US 2010/0201841 A1 Aug. 12, 2010

Related U.S. Application Data

(63) Continuation of application No. 10/683,953, filed on Oct. 9, 2003, now Pat. No. 7,719,606.

(60) Provisional application No. 60/417,477, filed on Oct. 9, 2002.

(51) Int. Cl.
*H04N 5/225* (2006.01)

(52) U.S. Cl. ........................................ 348/360; 348/335

(58) Field of Classification Search .................. 348/360, 348/223.1, 335; 359/559, 599
See application file for complete search history.

(56) References Cited

U.S. PATENT DOCUMENTS 4,381,890 A 5/1983 Wallace
D270,069 S 8/1983 Wallace
4,473,289 A 9/1984 Wallace
4,527,189 A 7/1985 Ooi et al.
4,605,955 A 8/1986 Hashimoto et al.
4,669,824 A 6/1987 Wallace
4,739,394 A 4/1988 Oda et al.
5,148,288 A 9/1992 Hannah
5,153,713 A 10/1992 Kyuma et al.
5,619,260 A 4/1997 Miyadera
6,094,539 A 7/2000 Abe
6,249,601 B1 6/2001 Kim et al.
6,961,086 B1 11/2005 Ichikawa
2002/0130959 A1 9/2002 McGarvey

FOREIGN PATENT DOCUMENTS

EP 0755151 A2 1/1997
JP 2002037221 A 2/2002

*Primary Examiner* — Tuan Ho

(57) ABSTRACT

A system and method for effectively performing a white balance procedure for electronic cameras includes a neutral density diffusion light filter assembly adapted to be attached over the lens of a camera-type device equipped with an electronic device that captures image data using an image sensor device. Alternatively, the diffusion filter could be inserted internally in association with the lens assembly or built into the camera body as an external window associated with an independent image sensor device. The diffusion filter acts as an illuminance integrator of broad light acceptance angle to document light conditions (incident or reflective) that exist at the time an image is captured, thereby enabling a white balance operation at point of capture and production of a computer-generated image with little or no colorcast and requiring minimal (if any) subsequent manual color adjustment.

21 Claims, 7 Drawing Sheets

2 2 4 4 2 14 8 40 5 5

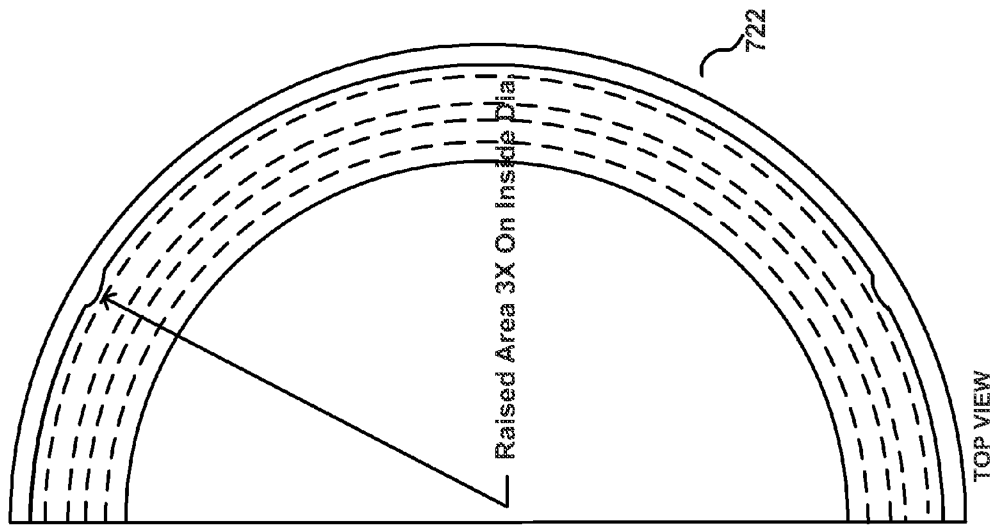
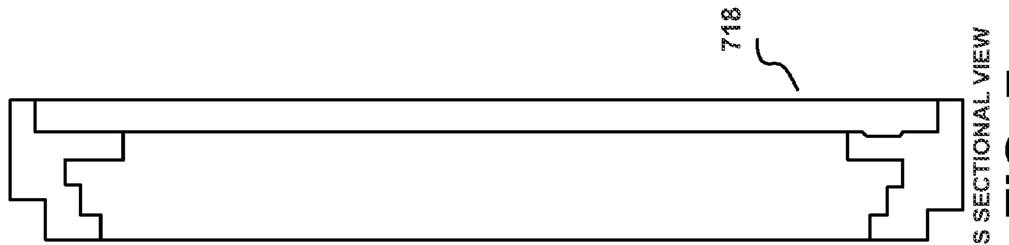
FIG. 7
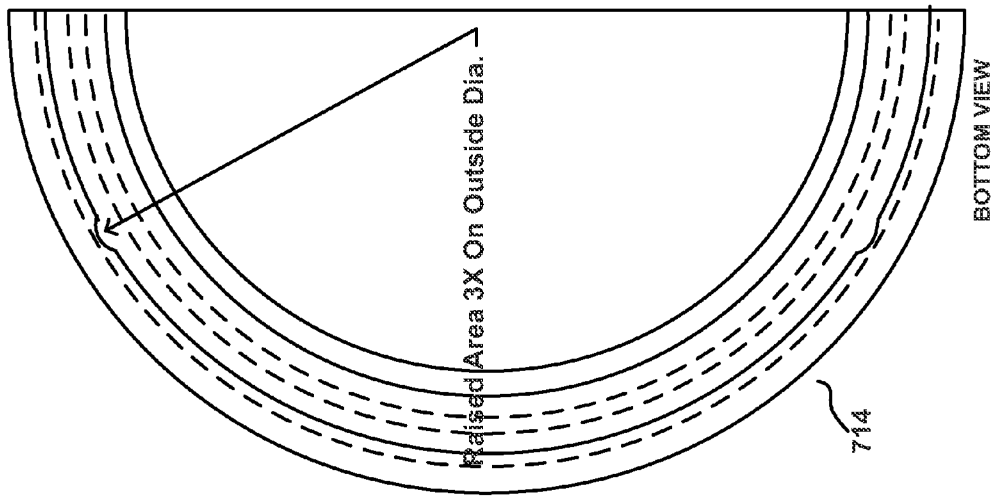

SYSTEM AND METHOD FOR EFFECTIVELY PERFORMING A WHITE BALANCE PROCEDURE FOR ELECTRONIC CAMERAS

CROSS-REFERENCE TO RELATED APPLICATIONS

This application claims priority and is a continuation of the U.S. patent application Ser. No. 10/683,953 filed on Oct. 9, 2003 entitled "SYSTEM AND METHOD FOR EFFECTIVELY PERFORMING A WHITE BALANCE PROCEDURE FOR ELECTRONIC CAMERAS", now U.S. Pat. No. 7,719,606 which claims the benefit of U.S. Provisional Patent Application No. 60/417,477, entitled, "Incident And Reflective Light Filter For Digital Cameras And Camcorders," filed on Oct. 9, 2002. Both are assigned to the assignee of the present invention, and both are hereby incorporated by reference in their entirety herein.

BACKGROUND SECTION

1. Field of the Invention

This invention relates generally to techniques for electronic imaging, and relates more particularly to a system and method for effectively performing a white balance procedure for electronic cameras.

2. Description of the Background Art

Implementing effective methods for performing electronic imaging is a significant consideration for designers and manufacturers of contemporary electronic entertainment systems. However, effectively implementing imaging systems may create substantial challenges for system designers. The white balance systems provided on most cameras are very fast and convenient, and they are good enough for general use in simply recording images of many common subjects.

However they are not satisfactory for controlling the white balance of subjects that are lighter or darker than average, or of subjects consisting of one dominant color, or for close-ups in general, or with any indoor subjects, especially in mixed light conditions. While pre-set functions on current models of digital cameras may produce colors that appear natural in some lighting situations, inaccuracies are unavoidable as long as built-in image sensors continue to read through the center of the field and are programmed to reflect the assumption that there is an "average" subject, that it's subject brightness level averages to 18% gray, and the camera's color manager is dependent on the presence of something white near the center of the image in order to derive an analysis of local color.

One method of making these hand-held cameras more effective would be to place a neutral card of any value facing the camera and in the same illumination as a subject to be photographed, and filling the cameras field of view, to serve as a "standard" value in place of the camera and meter's natural variable value, in establishing exposure settings for a given scene or subject.

If such a card were of optimum value for rendering of all values in the same illumination, then it would serve to provide optimum exposure settings for the rendering of all values in any illumination. However, such a card is a cumbersome thing to carry and protect and is awkward to use, and often reflects excessive light as well as local colors due to surface glare. In addition, when working with people, it is disruptive and awkward to use in that it is almost impossible to withdraw the subject's attention from the card so as to enable taking an adequate photograph.

It is clear from the discussion above that neither the "reflectance" method nor the "incident light" method is ideally suited for use with electronic cameras equipped with through-the-lens metering facilities. In conjunction with the "reflectance" method it is obvious that the use of a gray card with a hand-held film camera equipped with through the lens metering facilities is too cumbersome and inconvenient to be used by the great majority of photographers. Use of such card for determining the proper setting of the camera in anything but a studio environment has proved awkward, inconvenient and, despite knowledge of this method, has never gained favor with hand-held camera photographers.

For at least the foregoing reasons, it is apparent that developing new techniques for implementing imaging systems is a matter of concern for related electronic technologies. Therefore, for all the foregoing reasons, developing effective systems for implementing imaging systems remains a significant consideration for designers, manufacturers, and users of contemporary electronic imaging systems.

SUMMARY

In accordance with the present invention, a system and method are disclosed for effectively performing a white balance procedure for electronic cameras. In accordance with one embodiment of the present invention, a diffusion device of the invention comprises a flat translucent diffusion disc that incorporates a flat transparent lenticular prismatic disc on the outer surface (to capture all available illumination from 180 degrees) to encapsulate compensating light filters in order to achieve neutral gray/white density, all components being translucent to a specific degree, and the assembled unit being equipped with a flange structure adapted to attach and detach the structure quickly and easily from the lens assembly of a camera.

The invention may comprise a new method of determining white balance by making an exposure through the diffusion device (using the appropriate procedure for photographing a gray card while substituting the diffusion device for the gray card by making the exposure through the diffusion device while it is placed in front of the camera lens) to document on a full frame, neutral gray density image the combined averaged colorcast created by an imbalance of red-green-blue components present in all light captured within 180 degrees of the front of the lens plane. The combined averaged colorcast will reflect the correct proportions of red-green-blue channels according to the existing light conditions at the time of exposure.

The selection of these averaged red-green-blue values as the sole white balance reference for all exposures made in the same light conditions at the same time enables subsequent retrieval of all related images with a near-perfect white point/white balance achieved at point of contact, thereby eliminating the necessity for post-processing color corrections and dramatically speeding the workflow.

The selection of these averaged red-green-blue values as the sole white balance reference for all exposures made in the same light conditions at the same time enables the capture of images devoid of colorcast, thereby documenting a wide range of contrasting colors in near proximity and recording accurately the subtle variations present in all colors, including neutrals. These variations must be captured at point of contact, as any subsequent manipulation will impose a uniform colorcast over the entire image.

It is often desirable to custom tint the white balance to create a slightly warm light condition. This is easily accomplished by combining the diffusion device with the preferred filtration and making a single exposure to simultaneously create a full frame grayframe reference image of uniform consistency documenting the desired colorcast at point of capture, thus eliminating the need to manipulate the image in post processing procedures where image degradation is a factor.

The diffusion device provides the missing link in a digital system where the design of all components requires a theoretically perfect Zone V neutral density reference and perfect white balance in order to control image tones through the entire imaging process. The diffusion device gives a degree of control over both exposure and white balance (simultaneously) that is not attainable any other way. It is accurate to within 1/12 f/stop for exposure, and 1/6 f/stop for color. In addition, it is uniquely easy, fast and convenient to use.

To make a custom grayframe exposure for application with RAW files using the diffusion device, first attach it to the front of the lens. Select Auto White Balance in Program Mode or in Manual Mode with Manual Focus on the lens. For reflective light, aim the camera at the subject; for incident light, aim the camera 180 degrees away from the subject, or at the dominant light source. Make an exposure of the illumination level through the diffusion device to record a neutral grayframe, and select that grayframe for custom white balance.

An alternate method for in-camera formats (TIF, JPEG, or PSD) pre-processes a custom gray/white balance in the camera at the start of each batch exposed in the same lighting conditions, and relies on preset manual color balance appropriate to the dominant light source in the image.

For post process color correction with Photoshop or other similar software in any file format, use the medium gray eyedropper to click anywhere on the diffused grayframe image generated with the diffusion device, and apply that gray balance to the image needing color correction. This method can also be applied to correct entire batches of images provided they were captured at the same time and in the same lighting conditions.

The present invention discloses a diffusion device for application to a camera that permits setting the white balance by simply exposing an image with the diffusion device in place, and subsequently using that image to create a custom white balance. One object of the invention is the provision of a diffusion device for application to a camera that permits setting the white balance by simply exposing an image with the diffusion device in place, and subsequently using that image to create a custom white balance that can be applied to all images captured in the same light conditions.

The custom white balance may also be applied retroactively to unrelated image files captured at the same location in similar lighting, or to unrelated image files that have in common similar local colors and similar light conditions. For at least the foregoing reasons, the present invention therefore provides an improved system and method for effectively performing an electronic white balance procedure for electronic cameras.

BRIEF DESCRIPTION OF THE DRAWINGS

FIG. 7 shows three views of the light diffusion disk of FIG. 1, in accordance with one embodiment of the present invention.

DETAILED DESCRIPTION

Figure 1:
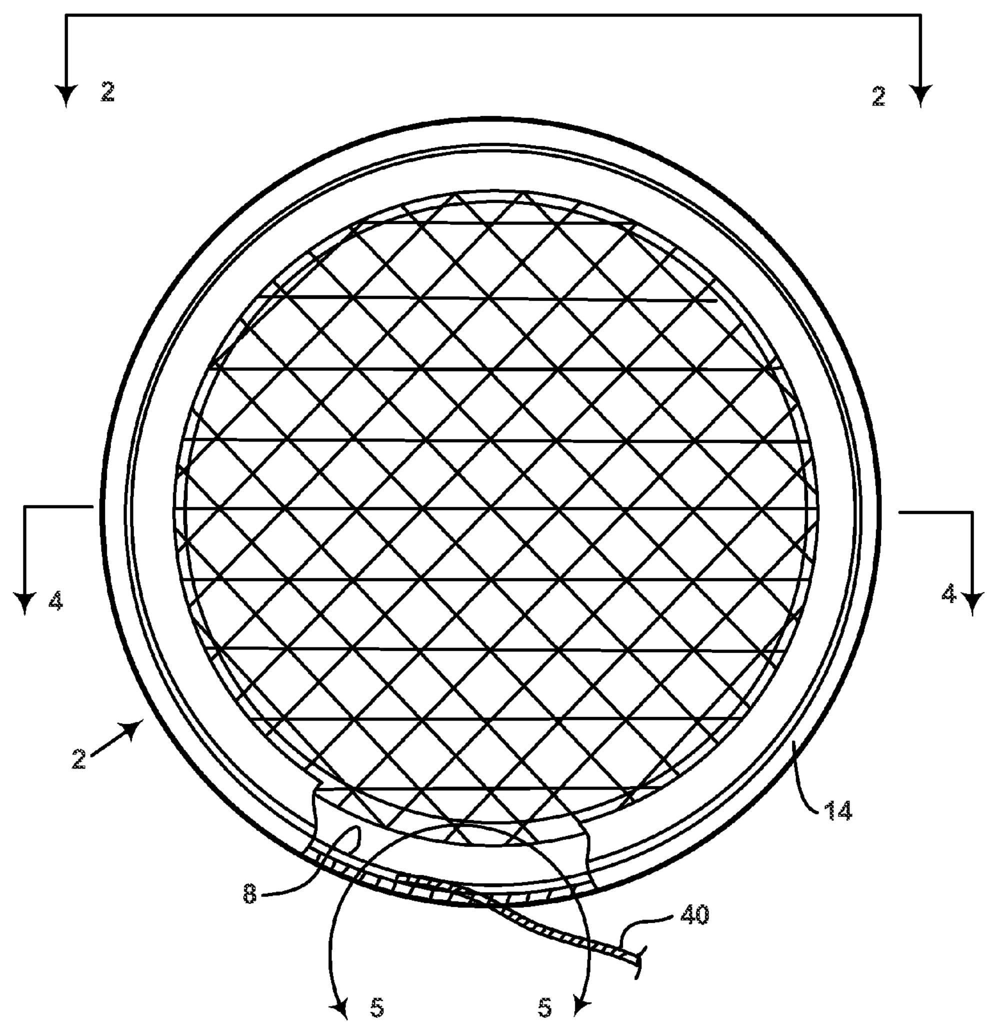
FIG. 1 is a front elevational view of a light diffusion disk for electronic cameras, in accordance with one embodiment of the present invention.

The present invention relates to an improvement in electronic imaging systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively performing a white balance procedure for electronic cameras, and may include a neutral density diffusion light filter assembly adapted to be attached over the lens of a camera-type device equipped with an electronic device that captures image data using an image sensor device. Alternatively, the diffusion filter could be inserted internally in association with the lens assembly or built into the camera body as an external window associated with an independent image sensor device. The diffusion filter acts as an illuminance integrator of broad light acceptance angle to document light conditions (incident or reflective) that exist at the time an image is captured, thereby enabling a white balance operation at point of capture and production of a computer-generated image with little or no colorcast and requiring minimal (if any) subsequent manual color adjustment.

In accordance with certain embodiments of the present invention, a neutral density light filter or cap assembly, manufactured to tight mechanical, spectral, and attenuation density tolerances, that acts as an illuminance integrator of broad light acceptance angle in photographic and scientific applications. It is useful for both incident and reflective-to-incident applications and metering techniques. It may be adapted to be attached over the lens of a digital camera-type device (digital cameras, camcorders, digicams, or any other devices used for recording digital images, all hereafter referred to as "digital cameras"), equipped with a through-the-lens built-in light metering facility and an image sensor device, with said light filter engineered to permit adjustment of the camera controls (either manually or automatically) and documentation on a digital data storage device, (including but not limited to a digital memory card) a near perfect 18% neutral density full-frame reference image of uniform consistency that will provide the most efficient and accurate method for achieving optimum 18% exposure levels (with incident light) and digital gray fwhite balance (with incident or reflective light), in camera or post processed, in view of the incident or reflective light conditions that exist at the time the picture is taken, and to enable later production of a computer-generated image with little or no colorcast and requiring minimal (if any) subsequent manual color adjustment.

Combining the light diffusion filter with other color-altering filters enables the creation of a digital white balance with a desired colorcast inside the camera thereby enabling first-generation images possessing white balance that has been corrected at point of capture with the preferred colorcast. The images created with this light diffusion filter also function as a key gray/white balance standard reference making it possible to create and preserve a near identical white balance throughout all stages of the digital imaging process.

This light diffusion filter also enables the referencing of an entire archive to a single constant neutral density reference, thereby enabling unlimited repeatable consistent and accurate color reproduction in a color managed environment. The consistency possible in the manufacturing of this light diffusion filter also enables the creation of unrelated archives containing digital image files of various color casts derived from multiple sources to be referenced to the same identical gray/white balance standard reference.

The neutral density diffusion device which here functions as a lens cap could also be mechanically inserted into the barrel of the lens, or incorporated into the body of the camera, and inserted automatically into the path of light entering through the lens assembly, thereby enabling diffused white balance data to be captured automatically for every exposure, or selected manually to document lighting conditions relevant to a specific sequence of images.

The significant elements of the neutral density diffusion device described above could also be incorporated as part of an independent window in the camera body to enable a white balance analysis based on light samples that have been collected, diffused and averaged to create a single uniform reference image that accurately represents the sum of all available light contributing to the photographic image, with each light source represented in the correct proportions.

The light diffusion filter described herein enables near-perfect exposures and near-perfect white balance using direct incident light metering methods. When used to meter incident light, it provides for consistently better exposures of any subject regardless of color or value, on any data storage device, in any lighting natural or artificial, and is especially valuable in mixed light. It meters a perfect zone V neutral density (18% reflectance) and enables near-perfect white balance in all situations, which can be instantly documented on a data storage device along with all images shot in the same light. Using this diffusion filter to pre-set the exposure and the white balance enables the production of first-generation images with perfect exposures and near dead-on white point in the first proof. This is by far the fastest and easiest way currently available to achieve white balance.

This same diffusion cap or filter may also be used with reflective light to determine white balance more accurately than currently possible using through-the-lens digital metering systems and built-in image sensors. In this application the camera with the diffusion device attached is pointed towards the subject, a single exposure is made (through the diffusion device) to record a gray frame, and that gray frame exposure is then selected to create a custom white balance. The diffusion device is then removed to permit the photographer to focus on the subject and actuate the shutter release.

Accordingly, it is one of the objects of the present invention to provide a device that is easily attachable to any camera in an unobtrusive manner, or that can be built into the optical path of the taking or metering lens or mechanism, that effectively passes substantially the same amount of light to the digital camera light meter as an optimum gray card reflects so as to permit direct correct adjustment of the camera aperture and shutter speed settings for the given scene or subject, after which the diffusion device may then be removed from the camera during the picture-taking operation.

Another important object of the present invention is to provide a diffusion device that is easily attachable to any digital camera type device in an unobtrusive manner, to enable a fast, easy and accurate assessment of the existing white balance at point of capture. Alternatively, the diffusion device can be implanted in the camera in association with the lens assembly and controlled mechanically or electronically during the white balance operation, to manually or automatically insert the diffusion device in the optical path of the metering image sensor device.

The diffusion device may also be integrated into the camera body as an independent exterior window comprised of a diffusion device functioning in association with an image sensor device to capture image data relevant to white balance. A similar function may be performed by separate incident light meters, but not in as direct a manner. Thus, with an incident light meter, most of which are expensive, fragile and losable, the light that is "read" by the meter travels a different path than that forming the image itself.

Additionally, such separate incident light meters are cumbersome in that they must be gotten out of whatever receptacle they are carried in, they must be uncovered and put into use, and once in use, a two stage procedure is required for operation, with attendant further losses in time, mood and rapport with the subject. With such incident light meters, it is necessary to adjust at least one ring or dial, locate and read off aperture numbers and shutter speeds, and transform those into exposure settings on the camera itself, with attendant cumulative small errors adding up as the procedure progresses.

Accordingly, it is another object of this invention to eliminate such complexities and chances for error by providing a diffusion cap or filter that is easily attachable to and detachable from the camera so that all that is required to meter light is to point the camera with the diffusion device attached away from the subject and toward the source of light (for incident light), adjust the aperture and shutter speed of the camera, aim the camera at the subject, remove the diffusion device, focus on the subject and actuate the shutter release. Another object of the invention is the provision of a diffusion device for application to a digital camera that permits adjusting the aperture and shutter speed settings without the necessity of reading any dials or scales to achieve proper aperture and shutter speed settings.

In certain embodiments, the present invention may be used in combination with an electronic camera device having a through-the-lens built-in light metering facility including a light-sensitive image sensor device and a lens assembly for admitting light to activate a light metering facility and for capturing image data on a digital data storage device within the camera. When this diffusion (translucent image-blocking) device is detachably secured in front of the lens assembly, approximately 18% of the incident light impinging on the diffusion device passes through the lens assembly to activate the light sensitive cells in the built-in light metering facility whereby adjustment of the exposure controls of the camera may be set (manually or automatically) and an exposure made with said diffusion device in place to document on a digital data storage device approximately 18% of the incident light source and near-perfect white balance at point of capture, after which said diffusion device is removed to enable the image of the photographic subject to pass through the lens assembly when the subject is photographed, with resulting documentation of lighting conditions to be repeated whenever lighting conditions change, enabling first generation images recorded in the same lighting conditions to subsequently be retrieved as computer-generated images with near-perfect white balance at point of capture.

A generalized sequence of steps using the diffusion device to make a neutral density exposure of specific light situations is described below, in accordance with one embodiment of the present invention. First the diffusion device is attached to the front of the lens. Then an exposure of the illumination level is made (from the subject's position, or at least in similar light, for incident light; towards the subject for diffused reflected light). Then custom gray/white balance (WB) is selected from the menu and the particular gray scale image that was just exposed is selected. After returning to the white balance setting the selection is then made for custom. After removing the diffusion device, this setting can be used for all exposures made in this same lighting. By using the initial neutral density exposure for processing image data, all images exposed in this lighting can be downloaded with a near dead-on white point and perfect neutral density exposure on the first proof. Whenever the lighting situation changes this process must be repeated to set a new custom white balance.

Another object of this invention is to provide a diffusion device easily attachable and detachable in front of the lens of a camera and fabricated from flat translucent discs of plastic, glass or other suitable material. In certain embodiments, the diffusion device is designed without threads in order to eliminate the possibility of crossing threads while mounting it in front of a camera lens. It utilizes three raised bumps on the exterior circumference of the assembly ring to enable a friction fit that can be pushed quickly inside the threaded recesses in front of the camera lens, rotating slightly as it is pushed. It is just as easily removed by reversing this same procedure.

Another object of the present invention is the provision of a diffusion device for use in conjunction with all electronic camera type devices equipped with image sensor devices, easily attachable and detachable to the lens structure of a camera, and which is provided with a flat lenticular or prismatic disc of translucent image-blocking plastic, glass or other suitable material which functions to admit approximately 180 degrees of incident light (without the bulk created by a hemispherical dome), used in conjunction with a diffusion disc of similar materials to transmit approximately 18% of available light impinging thereon, and supplemented with color correcting filters that are calibrated before assembly to adjust the diffusion device to a near perfect white point.

The "incident light" method has the disadvantage that it requires the use of a second and independent light metering facility in the form of a fragile hand-held meter pointed directly toward the source of illumination with exposure settings being indicated by the meter in accord with the strength of that illumination and the sensitivity of the data storage device to which the meter is attenuated. There is of course no question that this is an excellent method for accurately evaluating exposure conditions and determining exposure settings. However, the "incident light" method utilizing a separate hand-held meter does require the additional adjusting and reading of meter dials, and a manual translation of those readings into actual exposure control settings on the camera itself. These additional steps introduce a margin of error and a level of inconvenience that has worked to prevent the wide acceptance of the "incident light" method by photographers.

The light diffusion device forming the subject matter of this invention is inexpensive, easy to apply, and provides a more accurate basis for the setting of electronic camera controls then the methods described above. To that end, in terms of greater detail, this invention presents a translucent filter or cap adapted to be mounted on a camera lens assembly, or on a lens hood, and which functions to transmit or pass to the built-in camera light meter approximately 18% of the incident light impinging upon the filter. The filter may be prismatic in addition to being translucent so as to diffuse the light impinging thereon.

The translucent filter or diffuser passes approximately 18% of the light falling upon it to activate the built-in light meter whereas the gray card discussed above depends upon its "reflectance" characteristics which commonly do not approximate 18% of the light falling upon the subject for many reasons. It will thus be seen that the translucent filter or diffuser provided by this invention is far simpler, faster, more convenient, and practical and durable in use, and provides a better and more accurate measure of the light falling upon the scene or subject. Additionally, the translucent filter or diffuser avoids the gray card problem of surface glare and colorcast, factors often resulting in erroneous readings.

In another aspect, the translucent filter or diffuser forming the subject matter of this invention enables the creation of full frame neutral density images accurately summarizing the existing lighting conditions at point of capture, thereby identifying the exact color correction values required to achieve white balance. This is especially significant when artificial light sources are involved, particularly if there are multiple sources of mixed light.

In certain embodiments, the present invention may perform white balance operations directly from illumination levels, rather than from reflectance brightness values of the central part of the image based on the value of the subject, as is customary in hand camera use. In this respect, the incident light translucent filter or diffuser is designed to work in conjunction with any camera through-the-lens light meter to cooperate directly with the camera in a way similar to (but less restrictive than) the way in which separate hand-held incident light meters function, but eliminating the intermediate steps of observing readings on the separate hand-held meter and transferring such readings to appropriate dials and settings on the camera itself. It is especially invaluable in enabling accurate exposures in mixed-lighting situations.

Additionally, it should be noted that separate apart from the camera hand-held color meters that employ translucent discs or domes are especially designed to function with light sensitive cells and amplifiers specifically attenuated to produce the desired results when used in the manner prescribed. By contrast, the light diffusion filter of this invention functions with any camera equipped with through-the-lens metering facilities and/or an image sensor device to capture image data, and is independent of any specially attenuated light cells and amplifiers.

To emphasize the simplicity and the accuracy with which a camera's white balance can be adjusted when it is equipped with the light diffusion filter of this invention, the complicated procedures and labor-intensive post processing often required by in-camera programmed white balance options is in contrast to the use of the incident light translucent filter or diffuser of this invention, which works in conjunction with the camera's built-in light meter to almost instantly provide appropriate and optimum white balance settings. In addition, exposures made using these settings provide the fastest and easiest way to achieve a near perfect white point at point of capture.

In certain environments, the present invention may be effectively utilized in various medical and scientific applications. The present invention may enable the detection of various color shifts before the human eye is able to perceive such changes. Providing such color shift information to a computerized analysis system may advantageously provide various important benefits. For example, in a medical diagnosis context, generating early indications of color shifts may potentially allow an accelerated diagnosis of certain medical conditions.

Figure 2:
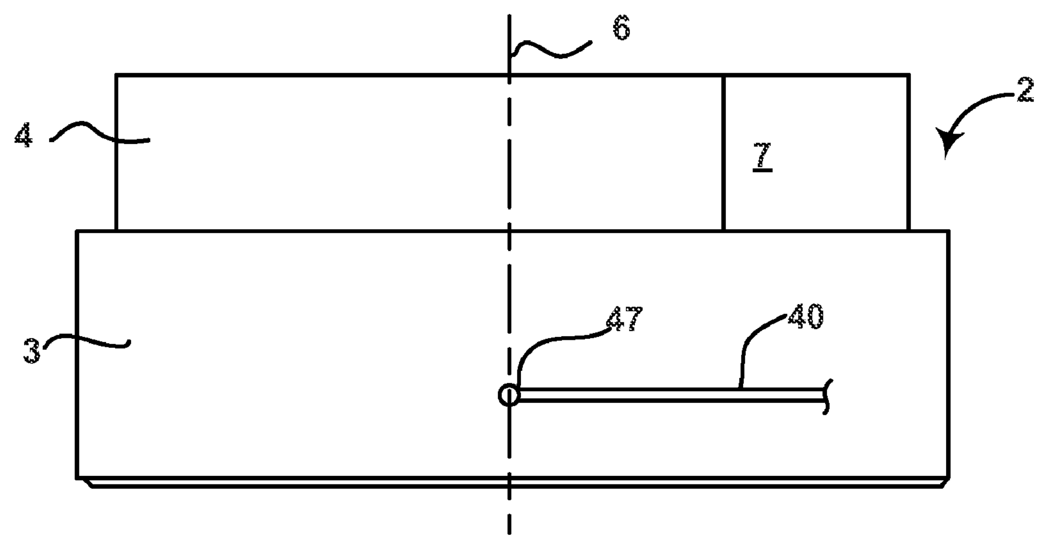
FIG. 2 is an edge view of the light diffusion disk illustrated in FIG. 1, in accordance with one embodiment of the present invention.

Referring now to FIG. 1, the ring structure forming a part of a light diffusion disk and for detachably mounting a filter or light diffusion disk on a tubular cylindrical lens barrel of a camera, or incorporated into other devices for mounting such other devices on cylindrical support structures, comprises a ring structure designated generally by the numeral 2, as viewed in FIGS. 1 and 2, the ring structure including a body portion 3 and a mounting flange portion 4, integral with the body portion and initially being coaxially disposed with respect to the body portion.

Figure 4:
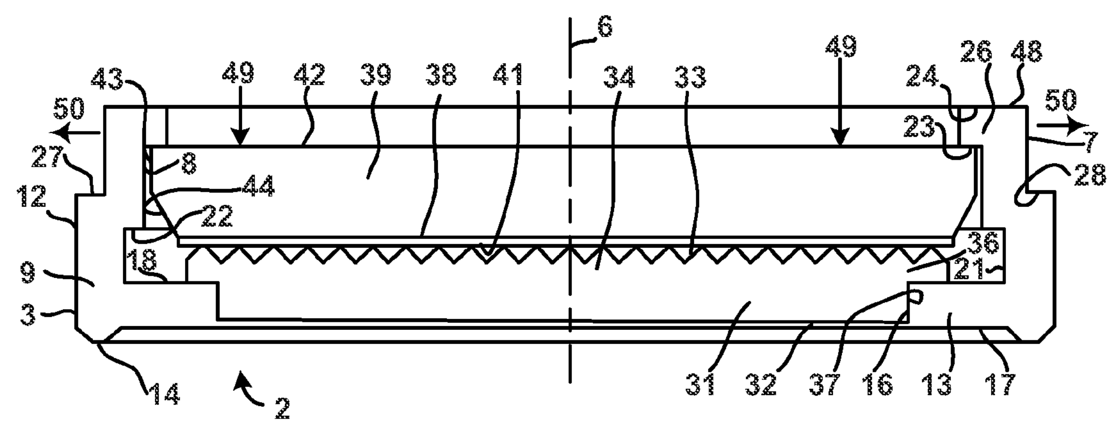
FIG. 4 is a cross sectional view taken in the plane indicated by the line 4-4 in FIG. 1, in accordance with one embodiment of the present invention.
Figure 5:
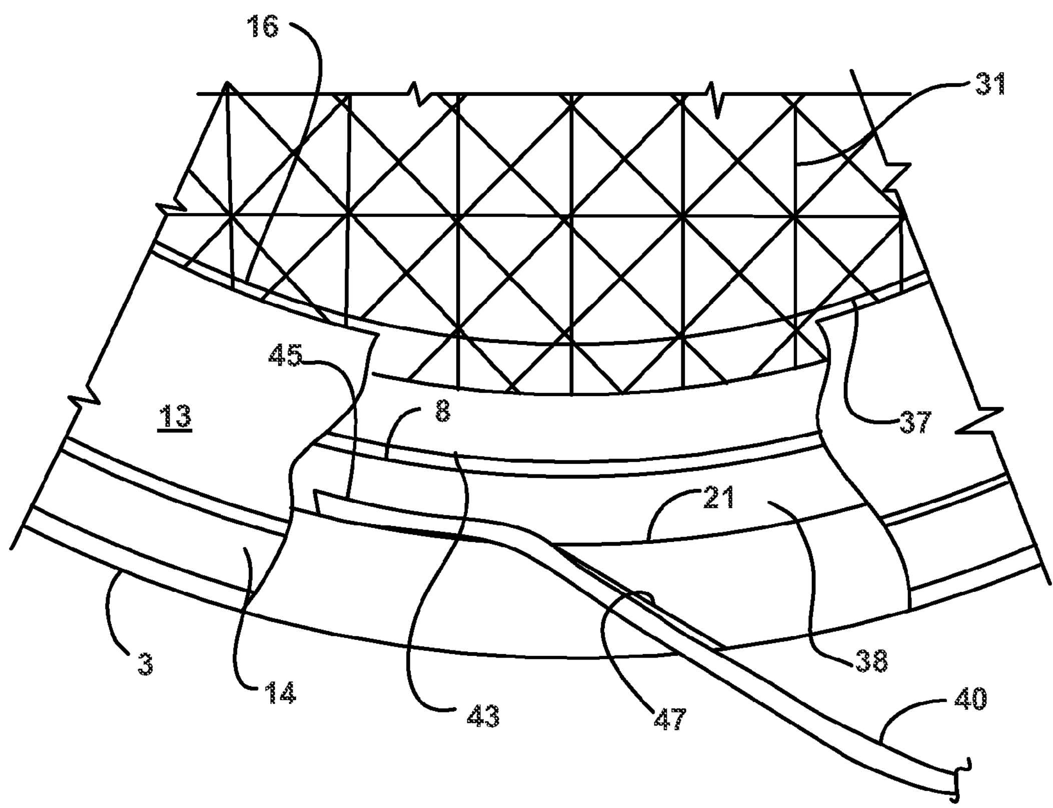
FIG. 5 is a fragmentary sectional view illustrating the method of attachment of a pull cord to the light diffusion disk assembly, in accordance with one embodiment of the present invention.

Both the body portion and the mounting flange portion are initially coaxially disposed about a central axis 6 and are modified, as will hereinafter be described, to provide the mounting flange portion with a non-circular exterior periphery 7, and/or a non-circular inner periphery 8 in a manner which will hereinafter be explained. Referring to FIG. 4, it will be seen that the body portion 3 of the ring structure includes a generally cylindrical portion 9 having an outer periphery 12, conveniently knurled to facilitate digital manipulation, and on one end being provided with a radially inwardly extending flange 13, the flange 13 being integral with the cylindrical portion 9 of the body 3, and being circumscribed by a short cylindrical flange or bead 14 as illustrated, which may be considered to be a short extension of the cylindrical wall portion 9.

Figure 3:
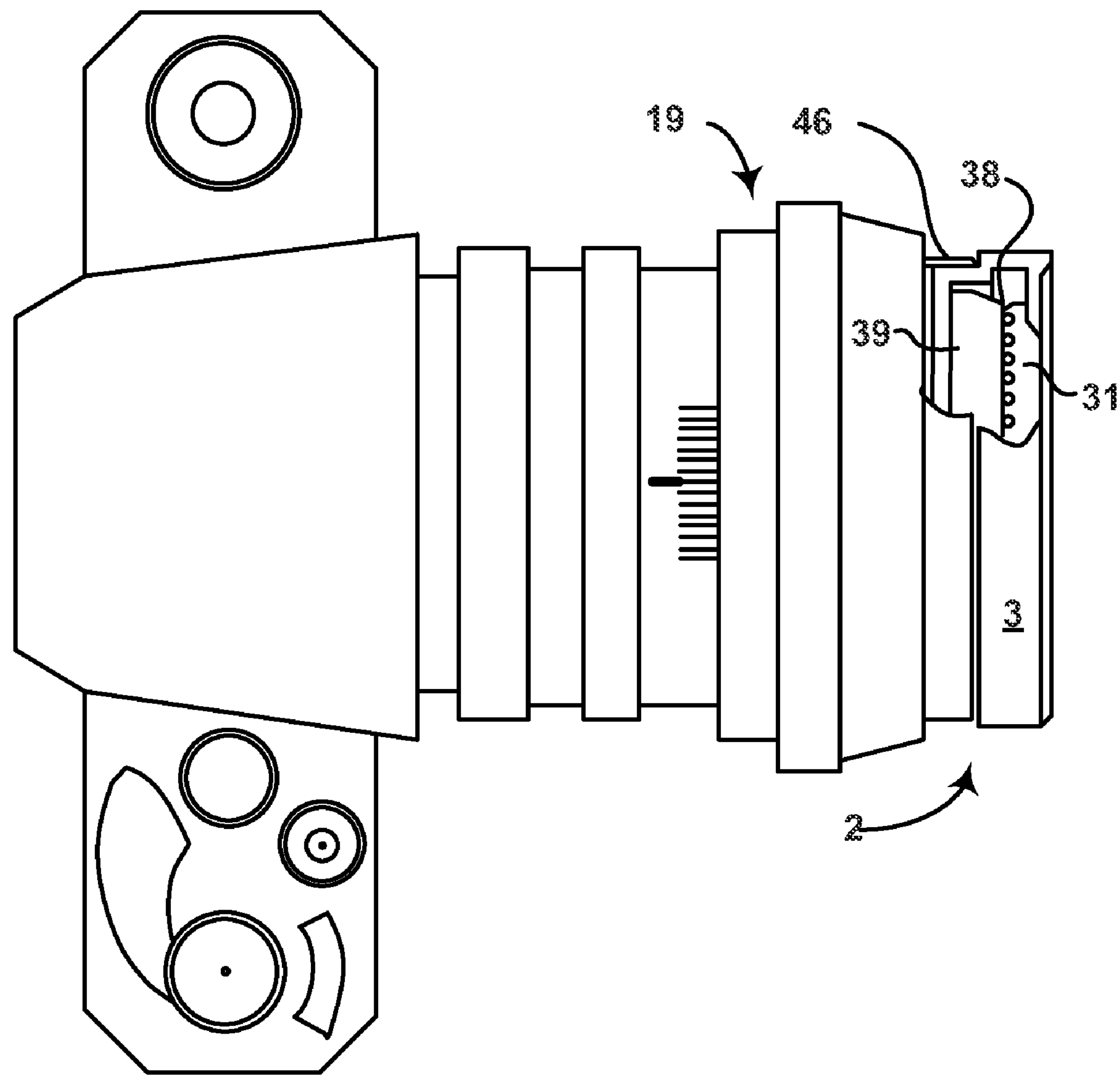
FIG. 3 is an elevational view illustrating the light diffusion disk mounted on a electronic camera lens barrel.

The radially extending flange 13 is provided with an inner peripheral surface 16, a front face 17, and a rear face 18, the rear face 18 joining the inner peripheral surface 16 and the front face 17 to define a circular aperture through which light is admitted to the lens (not shown) mounted within a lens mounting structure designated generally by the numeral 19 in FIG. 3. As illustrated in FIG. 4, the cylindrical wall portion 9 of the body portion 3 is recessed radially outwardly to provide an inner peripheral surface 21 that is substantially perpendicular to the rear face 18 of the flange 13, the inner peripheral surface 21 being generally cylindrical and circular and symmetrical about the longitudinal or central axis 6.

The inner peripheral surface 21 of the cylindrical body portion 9 is interrupted by a shoulder 22 defining an annular surface spaced from rear face 18 of flange 13, and lying substantially parallel thereto. The surface 22 is in turn interrupted by the inner peripheral surface 8 of the mounting flange 4. This inner peripheral surface 8 extends generally axially away from the flange rear surface 18, and is interrupted by a radially extending surface 23 which forms a shoulder defining the outer extremity of the inner peripheral surface 8, defined between the shoulders 22 and 23 as illustrated. The inner peripheral dimension of the shoulder 23 on mounting flange 4 is defined by the inner peripheral surface 24 of the end portion 26 of the mounting ring structure, and this inner peripheral surface 24, which is coaxially disposed about the central axis, and is circular in configuration, cooperates with the shoulder 23 in a way which will hereinafter be explained.

Additionally, it should be noted that between the circular peripheral surface 12 of the body 3, and the outer non-circular peripheral surface 7 of the mounting flange 4, there is a shoulder 27 which has the effect of reducing the diameter dimensions of the outer peripheral surface 7 to something less than the diameter of the cylindrical outer peripheral surface 12 of the main body. In like manner, the inner peripheral surface 8 of the mounting flange 4 is less in its diameter than the diameter of the inner peripheral surface 21, thus modifying the configuration of the cylindrical portion 9 of the body and the mounting flange portion 4 of the mounting ring to provide the equivalent of a "live" hinge 28 between the root of the shoulder 22 and the root of the shoulder 27. Thus, when a radially outwardly directed force is imposed on the surface 24 during assembly, the mounting flange portion 4 tends to elastically flex outwardly, with the live hinge 28 functioning as the turning or pivot point for the flange. During such flexure, which will hereinafter be explained, the mounting flange 4 assumes a substantially truncated conical configuration, with the small base in the area of the live hinge 28, and the major or large base defined by the end portion 26.

The cylindrical wall portion 9 and the non-circular mounting flange portion 7 are thus integrally formed to receive the remaining parts of the assembly, which in this instance include a circular diffusion plate or disk 31 having a front face 32 and a rear face 33 having prism-like projections 34 formed therein to disperse light striking the front face of the diffusion disk. The diffusion disk is fabricated from a suitable plastic material and is dropped into the central aperture defined by the inner peripheral surface 16 of flange 13 so that the radially outwardly projecting flange portion 36 of the diffusion disk rests on the inner surface 18 of the flange 13, while the cylindrical outer peripheral surface 37 of the diffusion disk 31 forms a snug slip fit with the surface 16 of flange 13.

Superimposed on the diffusion disk 31, so that it lies in contact with the apex ends of the prism-shaped members 34, is a color compensation disk 38, preferably fabricated from a light gauge plastic material having the appropriate formulation to filter the light that strikes the front face 32 of the diffusion disk 31, impeding excessive amount of such light as would produce an unwanted color. In this way, the amount of any color being passed to the film in the camera may be modified or not, as desired, within very close limits.

Superimposed on the color compensation filter 38 is a translucent filter plate or disk 39, circular in configuration, having a front face 41 which lies against the top surface of the color compensation filter 38 and in contiguous contact therewith, and having a rear face 42 from which light passes directly to the lens system of the camera. The translucent filter disk 39 possesses a circular outer peripheral surface 43 and a truncated conical configured peripheral surface portion 44 as illustrated.

During the assembly procedure, the ring structure 3 is supported on the bead 14 on an appropriate work surface (not shown). The terminal end 45 of the pull cord 40 is inserted through the tangentially directed aperture 47 so that the end portion lies in the recess defined by the inner peripheral surface 21, the shoulder 22 and the inner surface 18 of the flange 13. A drop of adhesive on the end 45 permanently adheres the end within the assembly, while the remainder of the pull cord 40 extends from the assembly. Next the diffusion disk 31 is dropped into place, as previously described, followed by the color compensation disk 38. The ring structure thus incorporates a light diffusion disk for detachable attachment on the lens barrel of a camera, or for use in mounting other objects on cylindrical support structures, comprises in one aspect a ring-like body the outer periphery or the inner periphery or both peripheries of which are formed in a non-circular non-cylindrical configuration so that elastic deformation of the ring-like body to bring it into a substantially circular configuration requires the imposition of a force on the ring-like body which when mounted is exerted against the supporting structure to effectively hold the ring-like body on the support structure.

In this aspect of the invention, the ring-like body may be toroidal in its configuration, having inner and outer peripheries one or both of which may be non-circular in its configuration, the inner and outer peripheries being joined by opposite front and rear faces to form a generally toroidal ring-like body possessing elastic deformability. The transverse or diametric dimension of the ring-like body in one plane is greater than the diametric dimension of the ring-like body in a second angularly disposed plane which passes through a common axis.

In another aspect of the invention, the ring structure may be formed by a circular toroidal body from which extends a generally tubular integral flange-like mounting portion, the inner or outer, or both inner and outer peripheries of the flange-like mounting portion being non-circular in configuration while the toroidal body from which the flange-like mounting portion extends is circular. In still another aspect of the invention, the ring-like mounting structure includes a main circular body portion and a tubular flange mounting portion having a non-circular exterior periphery for mounting the ring-like mounting structure on the lens of a camera. The ring structure is also provided with means for diffusing light impinging on one surface of the ring structure, with color compensation means, and with a disk for controlling the amount of light entering the camera, thus providing an effective light diffusion disk for application on the lens barrel of a camera equipped with an internal light metering system.

Figure 6:
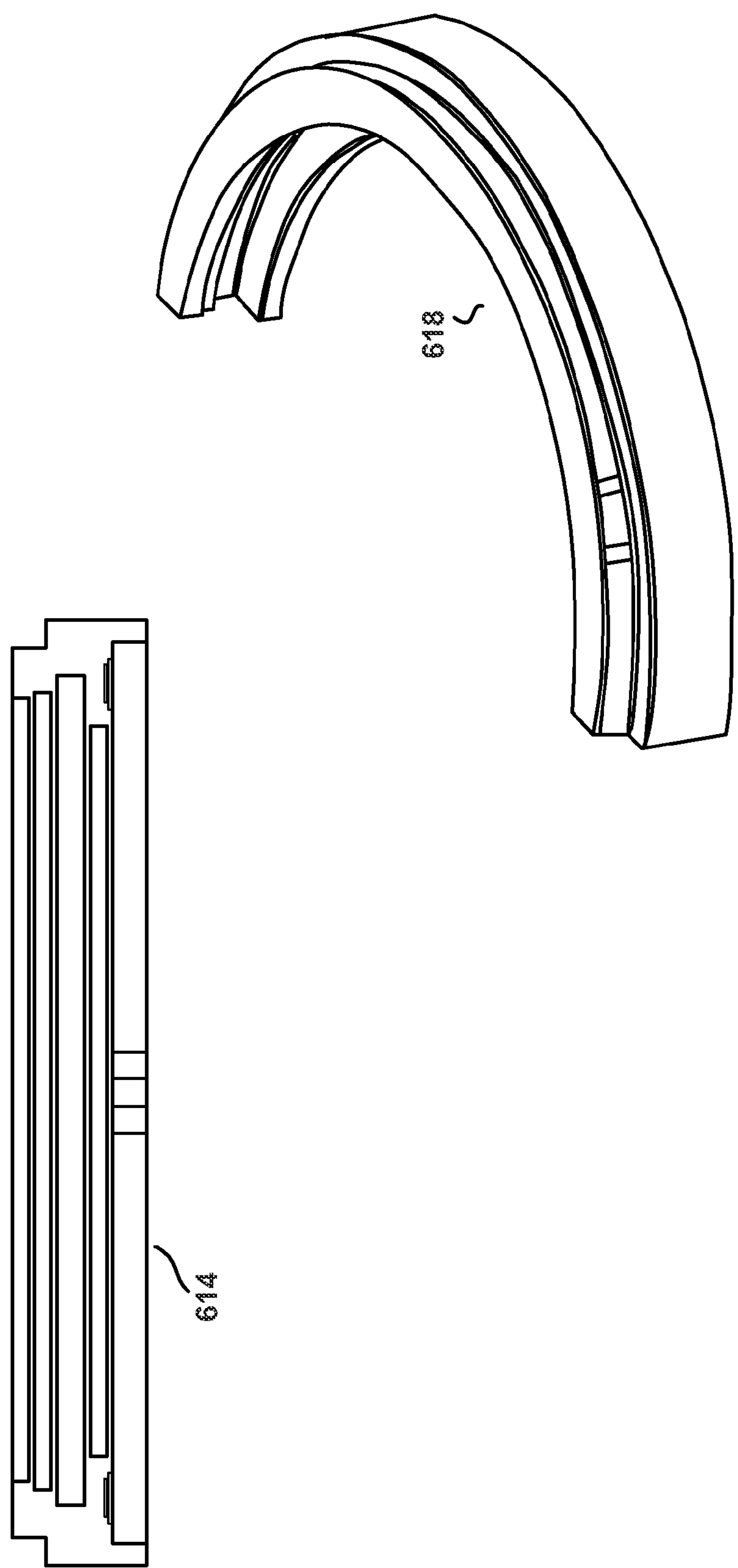
FIG. 6 shows two views of the light diffusion disk of FIG. 1, in accordance with one embodiment of the present invention.

Referring now to FIG. 6, two views of the light diffusion disk of FIG. 1 are shown, in accordance with one embodiment of the present invention. More specifically, a cross-sectional view 614 is shown, and a partial elevational view 618 is also shown. The views of the FIG. 6 embodiment, illustrate a technique for "sandwiching" or enclosing layered elements as part of the light diffusion disk. For example, the FIG. 6 embodiment may include, but is not limited to, an opaque back diffusion disc, one or more compensation filters in an inner region, and a front with inset ledge transparent prismatic lens to collect light from 180 degrees, integrate the light, and pass the light to an imaging sensor.

Referring now to FIG. 7, three views of the light diffusion disk of FIG. 1 are shown, in accordance with one embodiment of the present invention. More specifically, a bottom view 714, a cross-sectional view 718, and a top view 722 are shown. The views of the FIG. 7 embodiment, illustrate a technique for enabling a friction fit with a same size filter. For example, the FIG. 7 embodiment may include, but is not limited to, one or more raised areas on an outside diameter, as shown on bottom view 714. The FIG. 7 embodiment also may include, but is not limited to, one or more raised areas on an inside diameter, as shown on top view 722. The present invention may thus utilize projecting "bumps" or protrusions spaced equidistantly on appropriate inside circumferences to enable a friction fit with a same size filter.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. An apparatus for diffusing light for white balancing comprising:

a frame portion configured to be coupled with a camera device; and a filter portion coupled with said frame portion, said filter portion configured to receive input light and configured to responsively generate diffused output light, said diffused output light for enabling color correction associated with a white balancing procedure associated with said camera device, said filter portion comprising a diffusion plate that initially receives said input light with a substantially-flat first face, said diffusion plate also including a prism array of prism-like projections that are arranged on an opposing second face of said diffusion plate, individual components of said input light each being separately refracted, dispersed, and diffused by prismatic elements of said prism array to create uniformly diffused output light that accurately represents an averaged summation of all of said individual components of said input light in correct respective proportions.

2. The apparatus of claim 1 wherein said filter portion enables a broad light-acceptance angle of approximately 180 degrees with respect to said frame portion.

3. The apparatus of claim 1 wherein said filter portion comprises a flat and translucent disk of plastic-like material.

4. The apparatus of claim 1 wherein said filter portion comprises a flat prismatic disk of translucent image-blocking material resembling plastic or glass which functions to admit approximately 180 degrees of said input light which is also diffused by said flat prismatic disk.

5. The apparatus of claim 1 wherein said filter portion comprises a diffusion disc of translucent image-blocking plastic or glass to transmit approximately 18% of said input light impinging thereon, said filter portion being supplemented with one or more color correcting filters that are calibrated to adjust said filter portion to a balanced white point.

6. The apparatus of claim 1 wherein said filter portion further comprises a color compensator with one or more color filtration devices for altering one or more color components of said diffused light to produce corresponding filtered light that has desired color balance characteristics, said color compensator being selectable to allow said filter portion to be implemented as a completely color-neutral device that passes said input light without any color alterations, said color compensator alternately being selectable to intentionally add a desired colorcast to said input light that is passed through said filter portion.

7. The apparatus of claim 6 wherein said filter portion further comprises a translucent filter to attenuate said filtered light to produce said diffused output light, said translucent filter being selectable to ensure that said diffused output light is approximately 18% of said input light, said translucent filter also operating to further diffuse said filtered light to produce said diffused output light as a uniform neutral averaged-summation of all of said individual components of said input light.

8. A device for filtering light comprising:

a diffusion filter configured to receive input light and responsively generate diffused output light, said diffused output light for enabling white balancing associated with said input light, wherein said diffusion filter comprises a prism array of prism-like projections that are arranged on an opposing second face of said diffusion filter, individual components of said input light each being separately refracted, dispersed, and diffused by prismatic elements of said prism array to create uniformly diffused output light that accurately represents an averaged summation of all of said individual components of said input light in correct respective proportions.

9. The device of claim 8 wherein said diffusion filter enables a broad light-acceptance angle of approximately 180 degrees.

10. The device of claim 8 wherein said diffusion filter comprises a flat and translucent disk of plastic-like material.

11. The device of claim 8 wherein said diffusion filter comprises a disc of translucent image-blocking plastic or glass to transmit approximately 18% of said input light.

12. The device of claim 8 wherein said diffusion filter comprises a color compensator with one or more color filtration devices for altering one or more color components of said diffused light to produce corresponding filtered light that has desired color balance characteristics, said color compensator being selectable to allow said diffusion filter to be implemented as a completely color-neutral device that passes said input light without any color alterations, said color compensator alternately being selectable to intentionally add a desired colorcast to said input light that is passed through said diffusion filter.

13. An apparatus for enabling white balancing comprising:

a diffusion filter configured to receive input light and responsively generate diffused output light that is captured as a reference image for calculating color correction values to perform a white balance procedure for accurately representing captured electronic images, said diffusion filter comprising:

a diffusion plate for diffusing said input light with a prism array;

a color compensator for altering color characteristics of said diffused output light; and a translucent filter for attenuating said input light.

14. The apparatus of claim 13 further comprising:

a frame portion coupled with said diffusion filter, said frame portion configured to be coupled with a camera device.

15. The apparatus of claim 13 wherein said diffusion filter enables a broad light-acceptance angle of approximately 180 degrees with respect to a frame portion.

16. The apparatus of claim 13 wherein said diffusion filter enables transmission of approximately 18% of said input light as said output light.

17. The apparatus of claim 13 wherein said translucent filter comprises a flat and disk of plastic-like material.

18. The apparatus of claim 13 wherein said translucent filter comprises a flat prismatic disk of image-blocking material resembling plastic.

19. The apparatus of claim 13 wherein said diffusion plate comprises a prism array of prism-like projections that are arranged on an opposing second face of said diffusion plate, individual components of said input light each being separately refracted, dispersed, and diffused by prismatic elements of said prism array to create uniformly diffused output light that accurately represents an averaged summation of all of said individual components of said input light in correct respective proportions.

20. The apparatus of claim 19 wherein said color compensator is configured to be selectable to allow said diffusion filter to be implemented as a completely color-neutral device that passes said input light without any color alterations, said color compensator alternately being selectable to intentionally add a desired colorcast to said input light that is passed through said diffusion filter.

21. The apparatus of claim 20 wherein said diffusion filter further comprises a translucent filter to attenuate filtered light to produce said diffused output light, said translucent filter being selectable to ensure that said diffused output light is approximately 18% of said input light, said translucent filter also operating to further diffuse said filtered light to produce said diffused output light as a uniform neutral averaged-summation of all of said individual components of said input light.

* * * * *